(Model.)
J. BIRKENHEAD.
MECHANISM FOR SUPPORTING AND GUIDING DRILLS WHILE BEING GROUND.
No. 327,758. Patented Oct. 6, 1885.
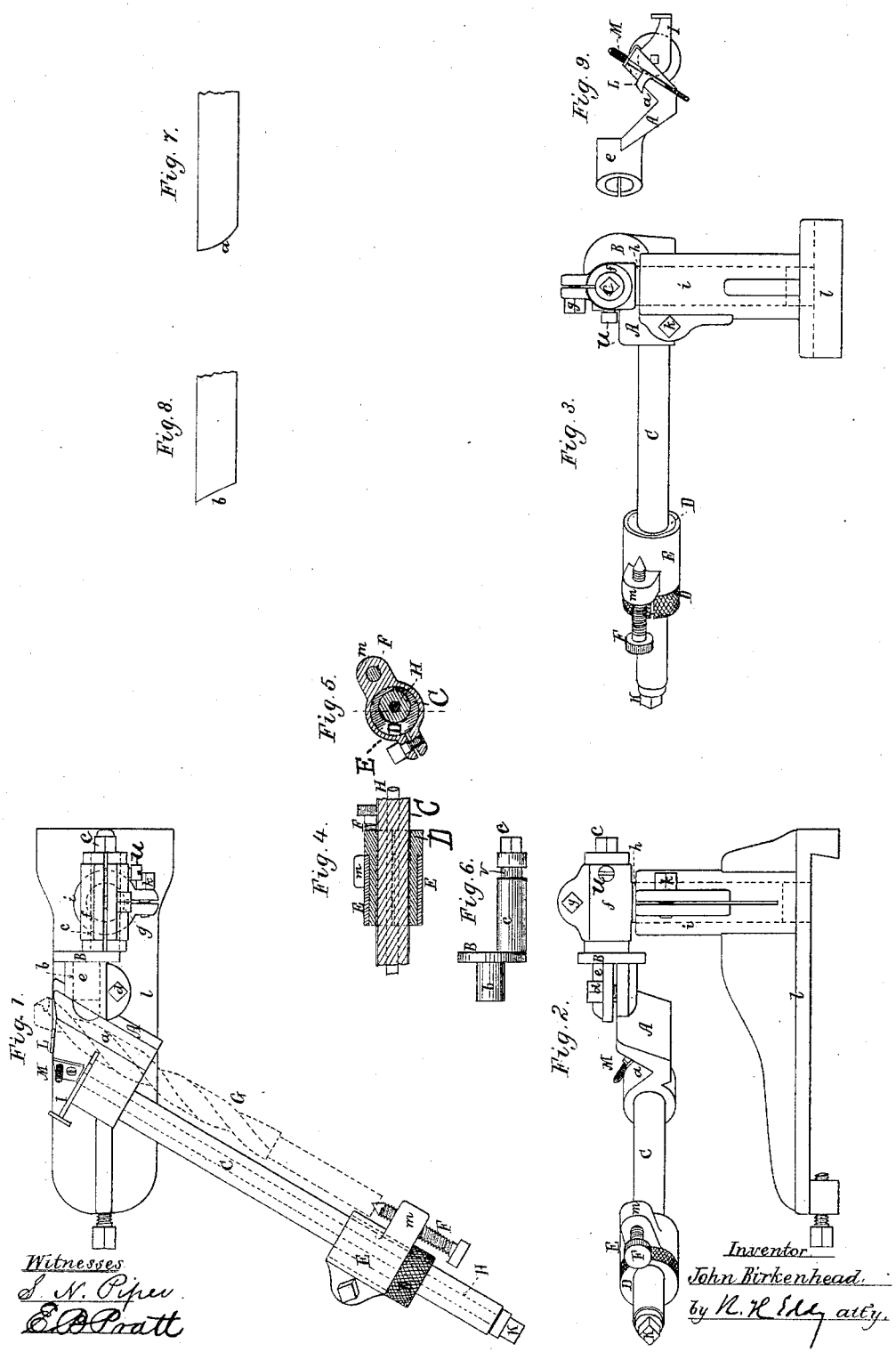

(Model.)  2 Sheets—Sheet 2.
J. BIRKENHEAD.
MECHANISM FOR SUPPORTING AND GUIDING DRILLS WHILE BEING GROUND.
No. 327,758. Patented Oct. 6, 1885.

Witnesses.
S. N. Piper
E. B. Pratt.

Inventor.
John Birkenhead.
by R. H. Eddy atty.

UNITED STATES PATENT OFFICE.

JOHN BIRKENHEAD, OF MANSFIELD, MASSACHUSETTS.

MECHANISM FOR SUPPORTING AND GUIDING DRILLS WHILE BEING GROUND.

SPECIFICATION forming part of Letters Patent No. 327,758, dated October 6, 1885.

Application filed September 19, 1883. Serial No. 106,796. (Model.)

*To all whom it may concern:*

Be it known that I, JOHN BIRKENHEAD, of Mansfield in the county of Bristol, of the Commonwealth of Massachusetts, have invented a new and useful Improvement in Mechanism for Supporting and Guiding a Twist or Angularly Pointed Drill while in the act of being Sharpened by a Grindstone; and I do hereby declare the same to be described in the following specification and represented in the accompany drawings, of which—

Figure 10:
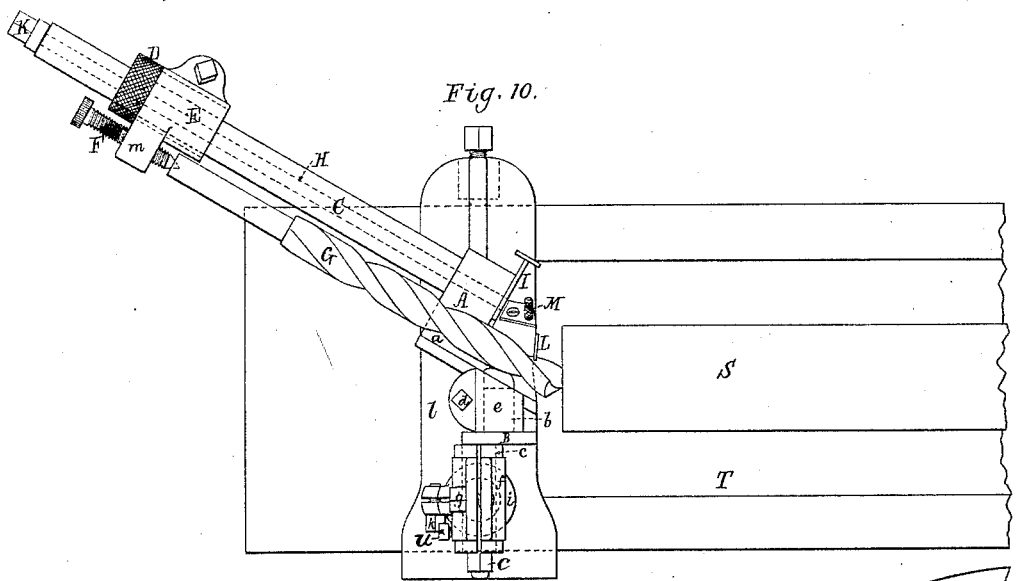
Figure 12:
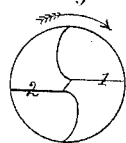

Figure 1 is a top view, Fig. 2 a front elevation, and Fig. 3 a side view, of mechanism embodying my invention, the nature of which is defined in the claims hereinafter presented. Fig. 4 is a longitudinal section, and Fig. 5 a transverse section, of the adjustable clamp or pivot carrier, the eccentric sleeve thereof and the tubular spindle of the adjustable tool-rest to be described. Fig. 6 is a top view of the disk B and its journals $b$ and $c$. Figs. 7 and 8 are drawings illustrative of two methods of curving the edges of angularly-pointed drills. Fig. 9 is a front end view of the tool-rest. Fig. 10 is a top view, and Fig. 11 a side view, of parts of a grindstone and its trough with a twist-drill and its sustaining mechanism, as hereinafter described, applied to it. Fig. 12 is an end view of a twist-drill, showing its cutting-edges.

In the said drawings, A denotes the tool-rest, it having on and through it, to receive the tool, a groove, $a$, right angular in its transverse section, such rest being supported on and clamped to the journal $b$ of a disk, B. This journal $b$ projects from one side of the disk concentrically with the circumference of the disk. From the opposite side of the disk another journal, $c$, extends eccentrically to the said circumference.

The tool-rest A can turn on the journal $b$, the part $e$, encompassing such journal, being contractible or constructed so as to be capable of being clamped to the journal by a screw, $d$, properly adapted to such part. The longer journal $c$ turns in and is supported by a bearing, $f$, contractible or constructed so as to be capable of being sprung and clamped to the journal by a screw, $g$. A screw, $u$, is screwed through one side of the bearing $f$ and into an annular groove, $v$, in the journal $c$, to prevent endwise motion of said journal in its bearing. This bearing $f$ has a journal, $h$, extending down from it into a post, $i$, also made so as to be capable of being clamped to the journal by a screw, $k$. This post extends upward from a base, $l$, having appliances for fixing it on the trough of a grindstone in a manner to enable the tool-rest to be brought into a suitable position relatively to the stone for a drill to be ground or sharpened thereby.

The devices described for supporting the tool-rest admit of it being turned horizontally and vertically for adjusting and moving a drill for the grindstone to grind it to the proper inclinations at its angular cutting end. By such devices the tool-rest can be raised or depressed, as the size or diameter of the drill to be sharpened may require, in order to bring the part to be ground into its due relation to the stone for such part to be ground convex rather than concave.

Drills for boring into metal, specially what are termed "twist-drills," usually have an angular cutting end, each of whose two bevels it is desirable to have somewhat convex rather than flat or concave transversely of it. If in grinding the drill by a grindstone such drill be moved rectilinearly forward against the periphery of the stone, it will be seen that the reduction of the end of the drill will necessarily be more or less concave; but to give greater strength to the drill at its cutting-edges it is desirable and it is customary, especially with a twist-drill, to grind it convexly to each cutting-edge, as shown at $a$ in Fig. 7, rather than concavely, as shown at $b$ in Fig. 8.

The object of having the tool-rest sustained by the journal $c$ and its bearing is to enable such rest, while a drill supported on it is being ground, to be turned, so as to cause the ground part to be reduced convexly vertically, as shown in Fig. 7, whereby the cutting part is rendered stronger than it would be if concave, as shown in Fig. 8.

From the tool-rest a tubular cylindrical shank, C, projects in manner as shown, it going through a cylindrical sleeve, D, whose bore is eccentric relatively to the periphery of such sleeve. The sleeve is sawed or split lengthwise to enable it to be clamped on the shank by a screw-clamp, E, encompassing the sleeve and provided with an ear, m, extending from it, (the said clamp,) as represented. Through the said ear a pivotal screw, F, is screwed. A twist-drill is shown in dotted lines at G in Fig. 1 and in full lines in Figs. 10 and 11, as in the rest, and supported at its rear end by the said pivotal screw, whose conical end enters a like centering-recess in the end of the shank of the drill.

By revolving the sleeve D the clamp can be moved so as to bring the screw F nearer to or farther from the shank C, as the size of a drill to be ground may require; and besides this the clamp can be turned on the sleeve, so as to further adjust the screw in order for it to properly sustain the drill. By revolving the screw F the drill can be advanced toward and against the stone.

There extends through the shank C a rod or shaft, H, having projected from it at its end next the tool-rest an arm, I, formed as shown, the shaft at its other end being provided with a prismatic head, K. On applying a wrench to the said head and turning it the arm I may be turned down upon or off the drill as occasion may require, the purpose of the said arm being to hold or aid in holding the drill down within the rest by means of power applied by the hand of the attendant to the said wrench, said holding mechanism being for use in the grinding of drills of small diameter. Furthermore, there is adapted to the tool-rest an adjustable gage, L, which is particularly shown in Fig. 9 as arranged against its front end, and provided with a screw, M, for adjusting it nearer to or farther from the bottom of the said rest, as the size of drill to be ground may require. This gage is to extend into one of the spiral grooves of the drill and against one edge thereof, in which case the gage determines the position of the part to be ground, and enables an attendant to at once turn the drill to bring such part into its correct position.

Figure 11:
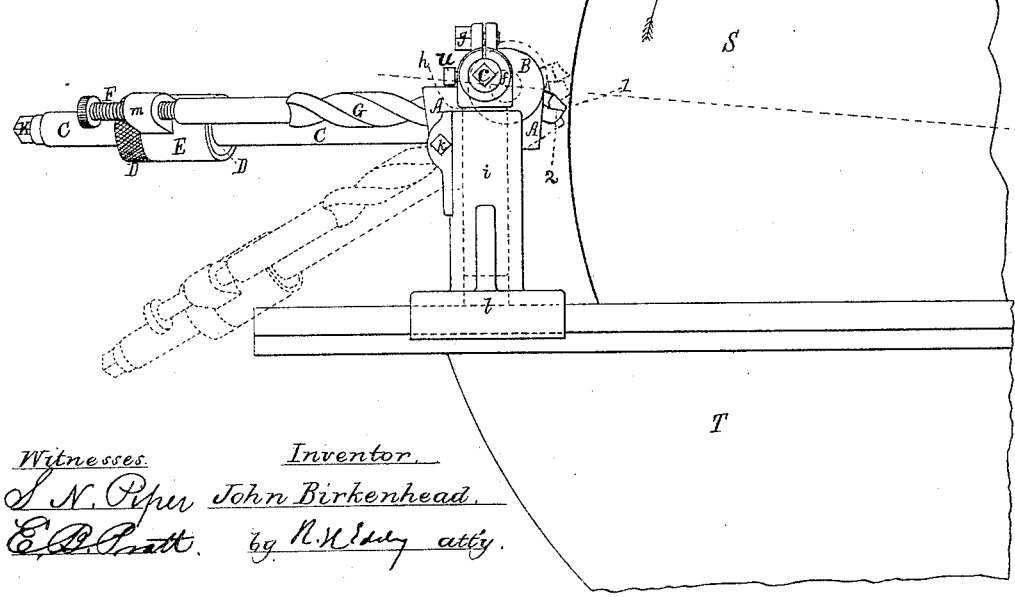

In Figs. 10 and 11 a grindstone in part is shown at S and its water-trough at T. In the said figures the base l of the twist-drill supporting mechanism is represented as arranged on and clamped to the said trough, a drill being exhibited as duly applied to the mechanism and the stone.

The operation of grinding a drill may be thus described: The front or cutting end of the drill is to be placed in the rest A, and the centering hole or recess in the rear end thereof is to receive the conical end of the screw F, (see Fig. 10,) which should and can be adjusted by means of the sleeve D, so that the drill will bear evenly in the rest. Said adjustment having been effected, the sleeve should be confined to the shank C by the clamp E. The clamp-screw d should now be loosened, and the journal c turned by the aid of a wrench applied to the prismatic part thereof, so as to raise or lower the journal b, as may be necessary to bring the axis of the drill a little below the said journal b. (See Fig. 11.) The screw d should now be tightened, so as to firmly hold the bearing e from turning in its journal b. The bearing f should also be made, by the screw g, to firmly bear on the journal c, so that it will not turn too easily thereon.

The cutting-edge of the drill to be ground should stand in a horizontal position or parallel to the axis of the stone, and the gage L should be adjusted by means of the screw M to bear against one edge of one of the spiral grooves of the drill. (See Fig. 10.) The grinding of the drill can now be proceeded with. The grindstone being in revolution, the drill should be advanced by the screw F to bear tightly against the stone by the attendant, who is supposed to hold the drill against the screw F with his right hand and the shank C in his left. The dotted lines in Fig. 11 represent a drill as it appears in the said operation, one of its lips being ground, the cutting-edge of said lip being in a horizontal position or parallel with the axis of the stone, 1 representing the lip that is being ground in Fig. 11 and diagrammatically in Fig. 12, and 2 that which is shown by the same number in both figures. The shank is now to be raised and lowered vertically. That part of the drill which comes in contact with the stone during said movements will of course be removed. The drill is again to be advanced by the screw F and the shank raised and lowered again, and this operation is to be continued until that part of the end of the drill shall have been properly ground. As the shank C is raised the tool-rest will turn on its axis c, and when the drill reaches the position shown in full lines lip 1 will have been carried past the nearest point of the stone and have received the shape shown in full lines in Fig. 11. The shank c should now be lowered, and the drill turned on its axis, or so as to bring lip 2 into the position previously held by lip 1. Now, on raising the shank c, as before, lip 2 will be ground to the same shape as lip 1. The drill is now to be revolved on its axis one hundred and eighty degrees of a circle, and the other part or bevel of the end of the drill is to be operated upon in like manner as the preceding one. The purpose of having the two journals b and c is to admit of the tool being raised or lowered as may be necessary for the grinding of drills of different sizes, it being desirable to have the axis of the drill, when in the rest and in a horizontal position, as shown in Fig. 11, a little below the journal c, on which the tool-rest swings in the operation of grinding, in order that the end of the drill, when ground, may have the desired convexity, said convexity being the arc of a circle whose center is in the axis of the journal c, produced. (See Fig. 11.) This invention is applicable to drills having cutting-edges of any shape, as well as the kind specifically shown.

I claim—

1. The tool-rest, substantially as described, in combination with mechanism for supporting it and adjusting it vertically and horizontally, and allowing of it being turned, essentially as set forth, such mechanism, as described, consisting of the tool-rest clamp *e d*, the disk B and its journals *b* and *c*, the clamping-bearing *f*, and its screw *g* and journal *h*, and the clamping part *i* and its screw *k*, arranged and adapted as represented.

2. The combination of the pivotal screw F, and its clamp E, and the eccentric and contractile sleeve D, with the tool-rest A and its shank C, all being arranged and adapted to operate in manner substantially as set forth.

3. The combination of the tool-holding arm I and its carrying-shaft H with the tool-rest A and its shank C, all being adapted and arranged substantially as set forth.

JOHN BIRKENHEAD.

Witnesses:
 R. H. EDDY,
 E. B. PRATT.